US008719820B2

(12) United States Patent
Jones

(10) Patent No.: US 8,719,820 B2
(45) Date of Patent: May 6, 2014

(54) OPERATING SYSTEM SHUTDOWN REVERSAL AND REMOTE WEB MONITORING

(75) Inventor: David K. Jones, West Valley City, UT (US)

(73) Assignee: Safe Outlook Corporation, North Salt Lake, UT (US)

( * ) Notice: Subject to any disclaimer, the term of this patent is extended or adjusted under 35 U.S.C. 154(b) by 1251 days.

(21) Appl. No.: 12/337,337

(22) Filed: Dec. 17, 2008

(65) Prior Publication Data

US 2010/0153951 A1 Jun. 17, 2010

(51) Int. Cl.
G06F 9/46 (2006.01)

(52) U.S. Cl.
USPC .......................................................... 718/100

(58) Field of Classification Search
CPC ....... G06F 9/4843; G06F 9/52; G06F 9/4881; G06F 9/3851; G06F 9/485
See application file for complete search history.

(56) References Cited

U.S. PATENT DOCUMENTS

| | | | |
|---|---|---|---|
| 6,745,367 B1 | 6/2004 | Bates et al. | |
| 6,795,856 B1 | 9/2004 | Bunch | |
| 6,944,793 B1 | 9/2005 | Parker | |
| 7,302,488 B2 | 11/2007 | Mathew et al. | |
| 7,533,277 B2 * | 5/2009 | Bernstein et al. | 713/300 |
| 7,543,325 B2 * | 6/2009 | Westbrook et al. | 725/93 |
| 2002/0049806 A1 | 4/2002 | Gatz et al. | |
| 2002/0120866 A1 | 8/2002 | Mitchell et al. | |
| 2005/0108383 A1 * | 5/2005 | DeHaas et al. | 709/224 |
| 2006/0161668 A1 | 7/2006 | Mathew et al. | |
| 2006/0218575 A1 | 9/2006 | Blair | |
| 2008/0195978 A1 * | 8/2008 | Wissenbach et al. | 715/854 |
| 2008/0228874 A1 * | 9/2008 | Fu et al. | 709/203 |
| 2009/0165132 A1 * | 6/2009 | Jain et al. | 726/22 |
| 2009/0190760 A1 * | 7/2009 | Bojinov et al. | 380/269 |
| 2010/0169472 A1 * | 7/2010 | Okamoto et al. | 709/224 |
| 2010/0325097 A1 * | 12/2010 | Er et al. | 707/702 |

OTHER PUBLICATIONS

CSJami Maxycom Software Download and Review, retrieved Dec. 2, 2008, from http://www.filesland.com/companies/CS-Jami/CSJami-Maxycom.html, 1 page.
Folder Watchdog Service Software Download and Review, retrieved Dec. 2, 2008, from http://www.filesland.com/companies/Seleznyov-Com/Folder-Watchdog-Service.html, 1 page.
Hibernate Software Download—SmartSleep—auto shutdown, PowrClik Suite, Wakeup, retrieved Dec. 2, 2008, from http://www.filesland.com/download/hibernate.html, 2 pages.
Net Control 2 Software Download and Review, retrieved Dec. 2, 2008, from http://www.filesland.com/companies/VAP-Software/Net-Control-2.html, 1 page.

(Continued)

Primary Examiner — Meng An
Assistant Examiner — Eric C Wai
(74) Attorney, Agent, or Firm — Nathan O. Greene; Brinks Gilson & Lione

(57) ABSTRACT

A method is disclosed for reversing operating system shutdown, including: detecting, by a monitoring program, an attempt by a user to log off, shut down, or restart a computer containing an operating system capable of running a plurality of program windows; determining if any program window is still open in the operating system; automatically cancelling, by the monitoring program, the logoff, shutdown, or restart request if it is determined that a program window is still open; and attempting to close any open program window by the monitoring program.

9 Claims, 10 Drawing Sheets

(56) References Cited

OTHER PUBLICATIONS

Parental Control Software Download and Review, retrieved Dec. 2, 2008, from http://www.filesland.com/companies/NTechnologies-Inc/Parental-Control.html, 1 page.
PC Spy Monitor 2006 Software Download and Review, retrieved Dec. 2, 2008, from http://www.filesland.com/companies/eMatrixSoft/PC-Spy-Monitor-2006.html, 1 page.
PC Time Limit Software at FilesLand, retrieved Dec. 2, 2008, from http://filesland.com/software/pc-time-limit.html, 1 page.
PCSentinel's Smoking Gun: Keylogger and More! Software Download and Review, retrieved Dec. 2, 2008, from http://www.filesland.com/companies/PC-Sentinel-Software/PCSentinels-Smoking-Gun-Keylogger-and-More.html, 1 page.
Power Shutdown Software Download and Review, retrieved Dec. 2, 2008, from http://www.filesland.com/companies/Snowportion/Power-Shutdown.html, 1 page.
PowerClick Software Download and Review, retrieved Dec. 2, 2008 from http://www.filesland.com/companies/Assembly-Developers/PowerClick.html, 1 page.
ShutDown Plus Software Download and Review, retrieved Dec. 2, 2008 from http://www.filesland.com/companies/DimaWare/ShutDown-Plus.html, 1 page.
Shutdown Software at FilesLand, retrieved Dec. 2, 2008, from http://filesland.com/software/shutdown.html, 2 pages.
WatchDog—Features, retrieved Nov. 10, 2008 from http://www.watchdogpc.com/features/, 2 pages.
Watchdog—Internet/Web, Computer & Network Activity Monitoring & Spying Software, retrieved Nov. 10, 2008, from http://rhombustechnologies.com/main.asp?page=WatchDog, 2 pages.
WatchDog—Remote Management, retrieved Nov. 10, 2008 from http://www.watchdogpc.com/support/help-manual/remote-management/, 3 pages.

* cited by examiner

OPERATING SYSTEM SHUTDOWN REVERSAL AND REMOTE WEB MONITORING

BACKGROUND

1. Technical Field

The disclosed embodiments relate to a system and methods to enable a monitoring program to reverse the shutdown of an operating system until windows are closed, and remote monitoring over the Web by a third party device through an intermediary server.

2. Related Art

Monitoring and parental control software that enable parents or employers to track and/or control computer usage on a client computer. Differing levels of control are provided in different ways. It may be more convenient and stealthy to monitor and/or control the client computer remotely. In the work place, this is generally done over a network, such as a local area network (LAN), behind the firewall usually deployed. Firewalls, either hardware (DSL modem or a Wireless router) or software (e.g., built into Windows by Microsoft of Redmond, Wash. or a third party program installed thereon), are also common within a home or small business. Accordingly, it is more difficult to establish such monitoring and/or control if access thereto is desired outside of the home or small business, e.g., beyond its firewall.

Furthermore, those being monitored, such as children or employees, may find ways around the monitoring or parental control software installed on their computer.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

By way of introduction, the disclosed embodiments relate to a system and methods to enable a monitoring program to reverse the shutdown of an operating system until windows are closed, and remote monitoring over the Web by a third party device through an intermediary server. The enclosed embodiments detail how an employer, parent, or other person may remotely monitor activity of a user on a client computer and prevent disabling of a monitoring program installed thereon with the aid, in some cases, of a remote or intermediary server. In some embodiments, the monitoring program may hide itself in various ways to prevent (or at least make very difficult) access to the installed files or system processes with which the user could tamper or even try to uninstall. In other embodiments, the remote server interacts with the monitoring program to ensure the monitoring program is not disabled and that it can monitor user activity over the Web. Furthermore, the monitoring program may detect and prevent attempts to spoof a shutdown of the client computer in efforts to cause it to close before shutdown of the computer, thereby circumventing the monitoring program.

Figure 1:
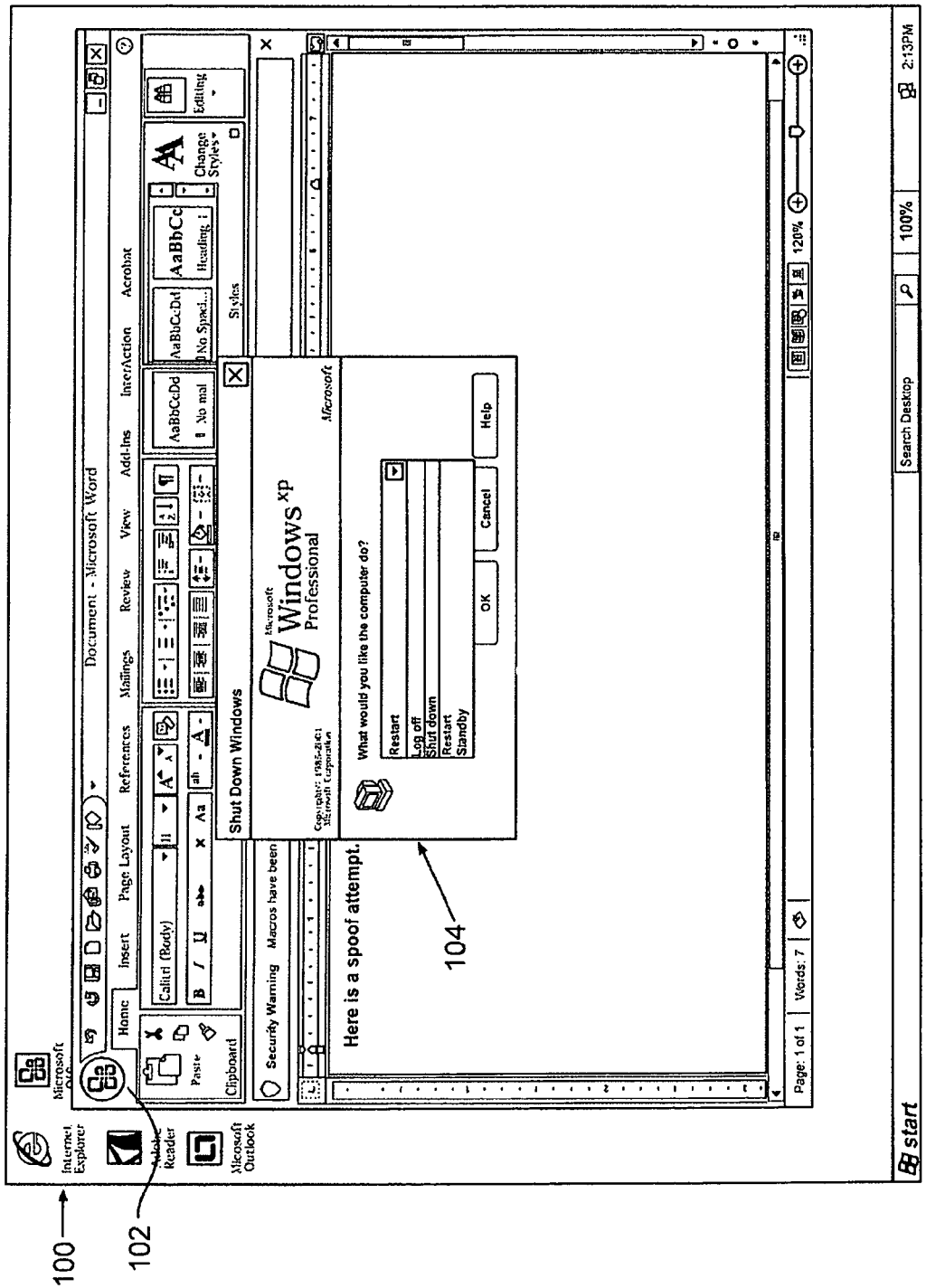
FIG. 1 is a screenshot of an attempted spoof of an operating system to force other programs—including monitoring programs—to close while one remains open, waiting to be saved.

FIG. 1 is a screenshot 100 of an attempted spoof of an operating system to force other programs to close—including monitoring programs—while one remains open, waiting to be saved. One technique learned by especially teenagers to disable monitoring (or parental control) software that runs on a client computer is to spoof a shutdown of an operating system. This is executed by attempting a shutdown or logoff, etc., in a shutdown window 104 while keeping open an editing program 102 with an unsaved document. Once the operating system, such as Windows by Microsoft, closes down its running programs, the editing program 102 will prompt a user to save the unsaved document (not shown) before completely shutting down. A user need only cancel the save prompt to keep working within the operating system that now has closed the parental control or monitoring software. In this way, some users have learned to circumvent the monitoring or parental control software.

In an embodiment, disabling or circumvention of the monitoring or parental control software is prevented by the following steps. The monitoring software may detect an attempt by a user to log off or shut down, etc., a computer containing an operating system capable of running multiple programs, some of which may be run in open windows displayed to the user. Upon detection of the attempt to shutdown the computer, the monitoring software determines if any program window is still open in the operating system. If there is an open window, the monitoring software automatically cancels the shutdown or logoff, etc. The monitoring software then closes each open program window until all open windows are closed. If each open window is closed within a predetermined period of time, such as 10 seconds, the shutdown or logoff may be reinitiated by the monitoring software. Accordingly, the spoof attempt is prevented because the operating system is not allowed to continue the shutdown process until all the programs are closed. Additional techniques to prevent disabling of the monitoring software will be discussed below, which may be used in addition to or alternative to preventing spoofing.

Figure 2:
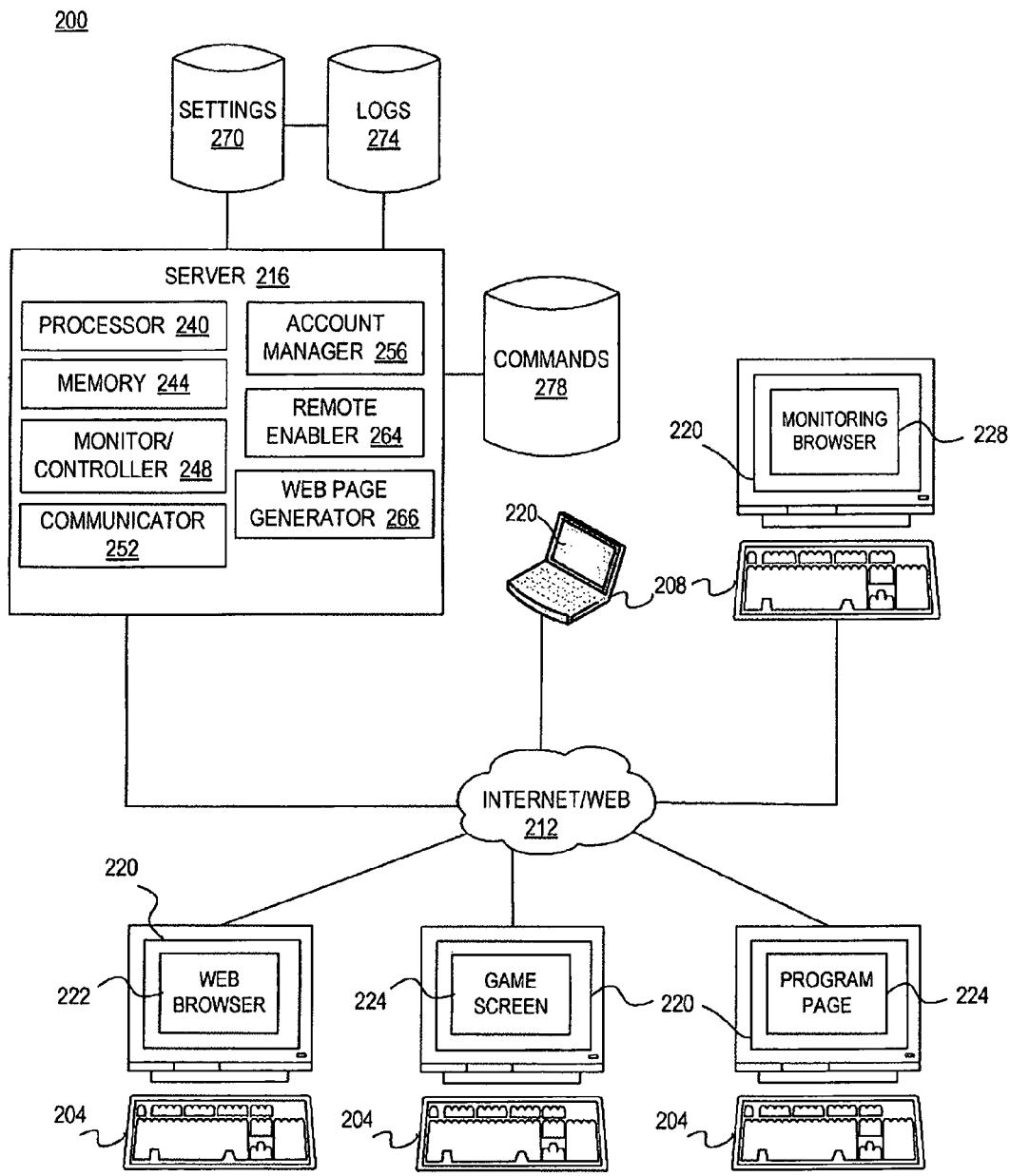
FIG. 2 is a screenshot of an exemplary system for remotely monitoring and controlling a client computer by a third party device over the Web through use of a secure, intermediary server.

FIG. 2 is a block diagram of an exemplary system 200 for remotely monitoring and controlling a client computer 204 by a third party communication device 208 over the Internet (or Web) 212 through use of a secure, intermediary server 216. The intermediary server 216 may be located remotely over the Internet 212 such that it may be accessed by the third party device 208 from anywhere it has Internet access. Each client computer 204 includes a computer screen 220 having a web browser 222 and one or more other program windows 224. Each client computer 204 includes installed monitoring software, which runs in stealth to monitor, undetected, activity of its user. The monitoring software communicates with the server 216 regarding monitored user activities through web-based code over any Internet connection. The client computer 204 will be discussed in more detail with reference to FIG. 3. The third party device 208 includes a monitoring screen 220 and a web browser 228 used for monitoring, which may be any available web browser 222. The third party communication device 208 may be a desktop computer, a laptop, a personal digital assistant (PDA) (FIG. 3), a Blackberry by Research in Motion, or any other stationary or mobile device capable of accessing the Internet, whether wirelessly or wired, through the web browser 228. Monitoring through the third party device 208 will be discussed in more detail with reference to FIGS. 4-8.

The intermediary server 216 may include, but is not limited to: a processor 240, a memory 244, a monitor/controller 248, a communicator 252, an account manager 256, a remote enabler 264, and a web page generator 266. The server 216 may further include a settings database 270, a logs database 274, and a commands database 278. The account manager 256 enables third parties, such as parents or employers, to sign up for remote monitoring and control of one or more client computers 204. The account manager 256 provides username and password (or other authentication information) to enable the third parties to log into the server 216 from anywhere having Internet connectivity. The account manager 256 also tracks and is responsible for interactions with third parties that sign up for monitoring services provided through the server 216. The communicator 252 facilitates communication with both third party devices 208 and client computers 204 over the Web 212. Account management information may be stored in the settings database 270 or other memory 244.

The web page generator 266 generates the monitoring web page within the browser 228 of the third party device 208. The monitor/controller 248 enables the third party devices 248 to monitor one or more client computers 204 and to control them remotely as will be discussed. The remote enabler 264 enables remote monitoring and/or control of the client computer 204 as directed by the account manger 256, and handles any technological requirements to enable such monitoring, facilitated by the server 216.

A number of commands are stored in the commands database 278 that provide remote control access to a monitored client computer 204. These commands may be stored in relation to a specific client computer 204 or to a group of client computers 204. The third party device 208, which may be coupled with the server 216, may reconfigure or change the plurality of commands stored in relation to a client computer 204 such that the server 216 reconfigures remotely a plurality of activity control settings on the client computer 204. The activity control settings enable specific levels of monitoring as well as the ability to remotely control certain programs or processes being run on the client computer 204. Herein, the phrase "coupled with" is defined to mean directly connected to or indirectly connected through one or more intermediate components. Updates to the monitoring and remote control capability by the server 216 of the client computer 204 take place in the form of regular updates as the monitoring software or program (348 in FIG. 3) of the client computer 204 regularly requests for new or updated commands from the server 216. Regular requests may be made anywhere from every few seconds to every couple minutes or more.

Monitored data from the client computer(s) 204 may be stored in the logs database 274. Monitored data includes, but is not limited to: keystrokes, screenshots, names of a title bar or window of the web browser 222, keywords entered in the web browser 222, Internet browsing history, cookies, downloaded content, program files used, and times of use of a program 224 or the web browser 222. The monitored data may also include violation of rules by the user, e.g., breaking parameters set up by the monitoring party, such as a parent or employer, through the account manager 256. When the client computer 204 is online, monitored data may be streamed continuously over the Web 212 to be stored in the logs database 274, making it impossible for a user to hide activity by deleting history or other tracking data from the client computer 204. Data may be sent to/from the server 216 by the client computer 204 in the form of standard secure web form (SSL HTTP) posts over port 443 (or other port now in existence or that may be made available), which bypasses typical firewall settings, even those that only allow the most basic Internet browsing capabilities. Port 80 may also be used, but without secured access, creating potential security issues. Communicating in a SSL HTTP form provides the most flexible and easily-implemented solution to remote monitoring where firewalls may be located between the server 216 and the client computers 204.

Figure 3:
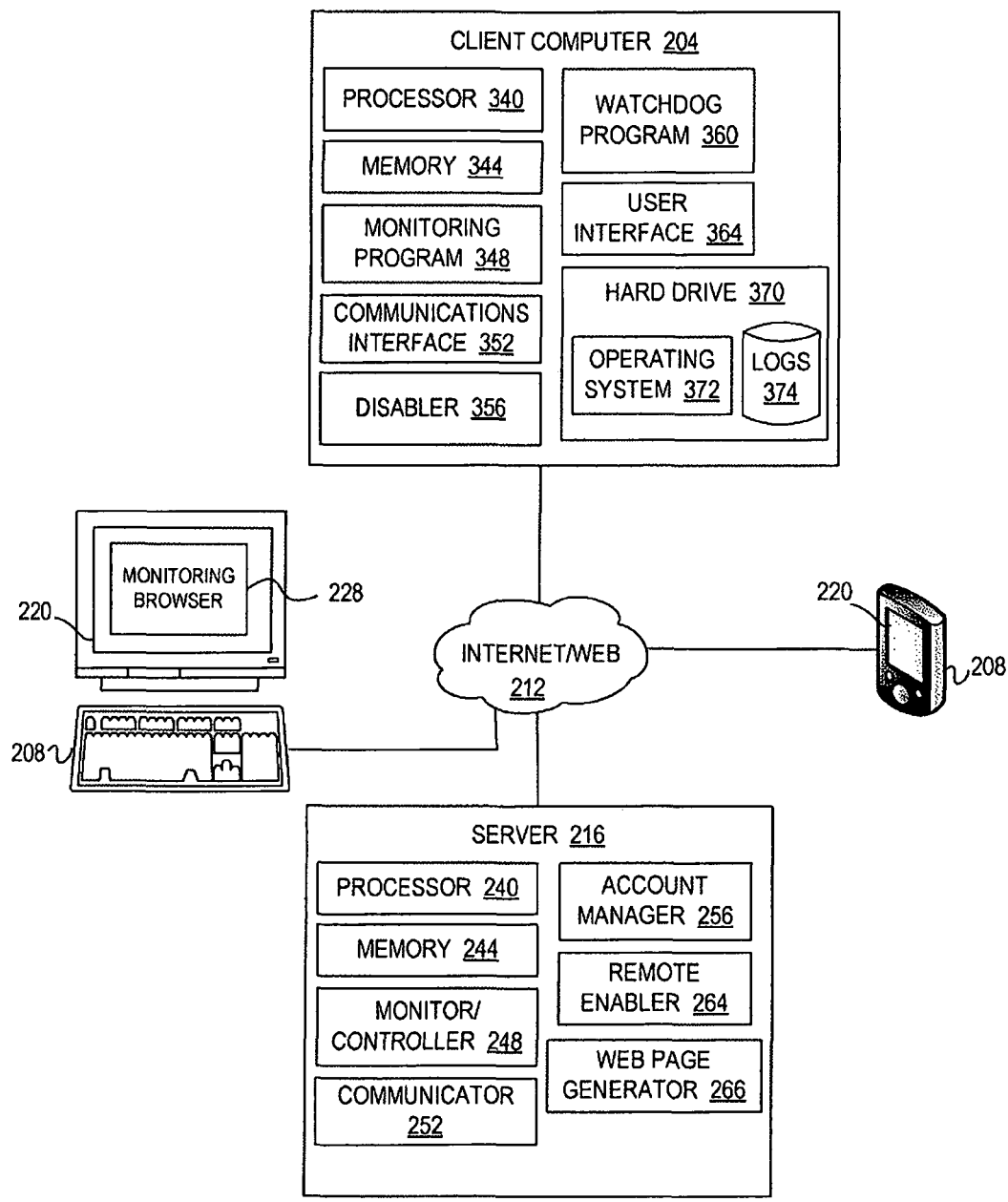
FIG. 3 is a block diagram of the exemplary system of FIG. 2, displaying further detail of an exemplary client computer to be monitored and within which an operating system shutdown may be reversed by a monitoring program.

FIG. 3 is a block diagram of the exemplary system of FIG. 2, displaying further detail of an exemplary client computer 204 to be monitored and within which an operating system shutdown may be reversed by a monitoring program. Details already displayed and discussed with reference to FIG. 2 may not be repeated. The client computer 204 may include, but is not limited to: a processor 340, a memory 344, a monitoring program 348, a communications interface 352, a disabler 356, a watchdog program 360, and a user interface 364. The client computer 204 may further include a hard drive 370 (or other storage) containing an operating system 372 and a logs database 374. The client computer 204 may include additional hardware and software features. The monitoring program 348 and watchdog program 360 may also be stored in the hard drive 370 and be run on top of the processor 340 and memory 344 when the client computer 204 is running.

As discussed, the monitoring program 348 is installed on the client computer 204 to enable monitoring by third party devices 208 through the server 216. The program files of the monitoring program 348 may be installed in a system folder that requires administrative access to be deleted. In this way, users to be monitored are prevented from disabling the program 348 by deleting the program files from the hard drive assuming their accounts are set up with other-than-administrator rights. Furthermore, one or more passwords may be used to prevent uninstalling the program or changing its settings. Encryption may be used to store passwords on the computer so they cannot be detected and/or accessed. Such encryption may include algorithms including data encryption standard (DES), Triple DES, Blowfish, advanced encryption standard (AES), or other standards as may be required by regulation. The encrypted login information could be stored as a browser cookie, a register entry, or as a file.

Once installed, the client computer 204 launches two programs when it starts up, the main monitoring program 348 and the watchdog program 360. Both programs keep launching the other every so often, such as for example, every second or more or less often than that. The second instance of either program immediately exits when it detects the first instance. In this way, if either the monitoring program 348 or the watchdog program 360 is disabled for any reason, the other will quickly restart it. The chances of any user being able to simultaneously disable two different programs are slim.

The disabler 356 may be a part of the monitoring program 348 or run in conjunction therewith. The disabler 356 enables disabling of all system programs of the client computer 204 that, during normal operation, could be used to disable the monitoring (or parental control) software. Such system programs that may be disabled include, but are not limited to, a registry editor, a task manager, and an operating system configuration program. The disabling by the disabler 356 may be automatic, in response to rule violations as discussed below.

Once installed, the monitoring program 348 may be run in stealth mode, which shows none of the usual indication that the program 348 is running (e.g., no icon in a Windows task bar and no process listed in the Windows Task Manager). The program is automatically started up in stealth mode if the reciprocal watchdog technique is used to start the program. This prevents providing feedback to the user that a particular attempted disabling technique has failed. Furthermore, the monitoring program 348 may rewrite instructions to the operating system 372 for the program 348 to be restarted when the client computer 204 restarts in case such instructions had been deleted for any reason.

Other techniques may be employed to hide the installation of the program. The names of the monitoring program 348 and of the watchdog program 360 may be masked as a series of letter and numbers that do not readily identify the program, and optionally, that appear to be routine programs or updates of the operating system 372. Dialog boxes that may be used to communicate with the user are configured so that the critical process names are not revealed when the dialog boxes are active. Furthermore, the dates and/or times associated with the files of the monitoring and watchdog programs 348, 360 may be scrambled so that locating them, chronologically in the folder by the user is made more difficult.

As discussed above, the server 216 is configured to remotely, over regular Web channels, monitor and control the client computer 204. For instance, the server 216 may, by command from the third party device 208, cause the disabler 356 to disable any system program that could be in turn used to disable one or both of the monitoring and watchdog programs 348, 360. Furthermore, any attempts to spoof a shutdown may be blocked and otherwise prevented as discussed with reference to FIG. 1.

Also, monitored data may be stored on the server 216 in the logs database 274. As discussed, the monitored data is continuously streamed to the server 216 by the client computer 204 as long as the latter is online, e.g., has connectivity to the Internet 212. The monitored data may also, however, be stored in the logs database 374 (or some location on the hard drive 370 or other storage) so that when the client computer 204 is offline, the monitored data may still be tracked and stored for later upload to the server 216 once an online connection is restored. The monitored data may be encrypted before it is sent to the server 216 for storage in the logs database 274. Once uploaded, the monitored data may be deleted from the client computer 204.

The folder or folders used for storing locally the monitored data may also be made stealthy by providing access to them only to an administrator and by masking their identity through techniques already discussed above. Furthermore, the monitoring program 348 may track and disable any number of dialogs created when the user attempts to delete browsing history or Internet cookies, thereby preventing deletion of such tracking. Accordingly, just the attempt to delete browsing history or Internet dialogs may be tracked and becomes part of the monitored data.

The monitoring and/or watchdog programs 348, 360 may regularly request updates or new commands from the server 216 so that the third party devices 208 may stay in interactive control while monitoring user activities on the client computer 204. Such interactive control and monitoring take place through the browser 228 of the third party device 208. As part of setting up an account through the account manager 256, the third party devices 208 may configure a set of parameters or rules by which the users of the monitored client computer 204 need to abide. When a parameter or rule is violated, an indication thereof appears in the web browser 228 of the third party communication device 208. In some embodiments, the server 216 may also automatically send an alert email or text message to a mobile device of the person monitoring the client computer 204, which mobile device may be the third party device 208.

Those performing the monitoring, such as parents or employers (variably referred to herein as an operator), may further send updates or new commands to the server 216 that take immediate corrective action on the user in regards to the parameter or rule violation. This may include shutting down the program window in which the user violated the parameter or rule, flashing a warning sign indicating detection of the violation, or even locking the user out of the computer 204 by logging the computer off or shutting it down. Further commands may allow control of any number of system or installed programs of the client computer 204 in response to certain violations.

Automatic corrective actions are carried out by the monitoring program 348, the disabler 356, the watchdog program 360, or a combination thereof, in response to detecting a rule or parameter violation. These corrective actions may also be directed by the third party device 208 via the server 216 based on standing commands stored or sent to be stored in the commands database 278 (FIG. 5), which are used to update control of the monitoring program 348. Such actions will normally be with respect to programs, such as games, a web browser 222, or other program that could be automatically shut down without risk of loss of data. In contrast, the corrective action may be carried out manually by request of the operator of the third party device 208 when a manual command is sent by the operator. Sending a manual command that turns over control to the operator of a specific program 224 of the client computer 204 enables the operator to ensure data is first saved before the program 224 is shut down. This is necessary when the program 224 is editing software of some kind, which would lose data if caused to be shut down automatically.

In some cases, the parent or employer may desire to not remotely control the client computer 204 to thus be able to collect a history of such violations in the monitored data with which to confront the user at a later time, or to implement a remote control strategy addressing the violations. Allowing the monitored data to build up with the user activity, which is stored in the logs database 274 of the server 216, in turn enables the operator to gather a period of violations to determine a pattern of normal behavior of the user absent any on-going intervention.

Figure 4:
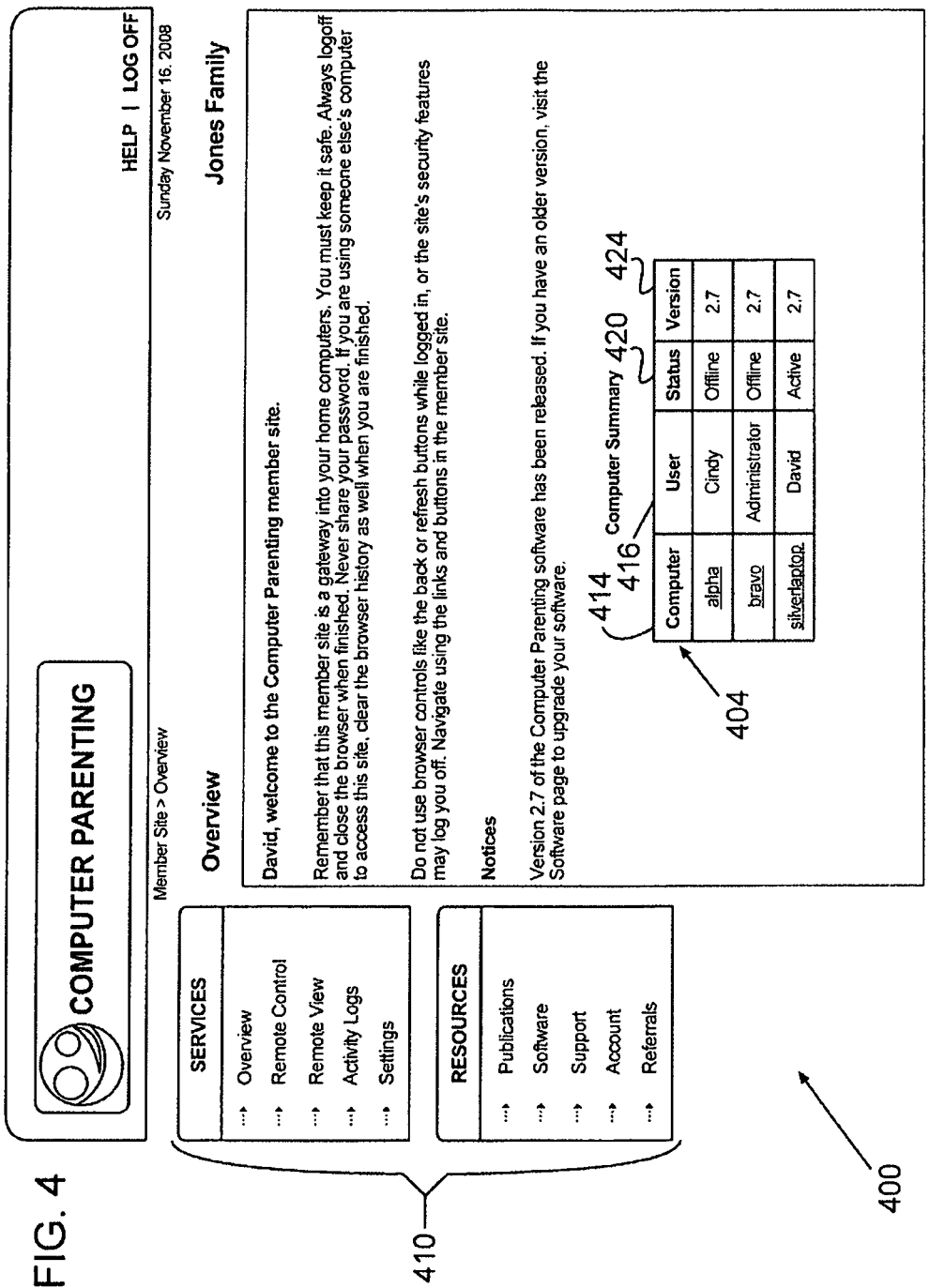
FIG. 4 is a block diagram of monitoring software being run on a monitoring, third-party device to monitor one or more client computers over the Web, including a status screen.

FIG. 4 is a screenshot 400 of the monitoring web browser 228 being run on a third-party device 208 to monitor one or more client computers 204 over the Web 212, including a status screen 404. The screenshot 400 provides an overview of available services, including a reminder of good security practices to ensure the web browser 228 is not left unattended or open to access by others. A menu 410 is listed at the left providing a number of services and resources. Among the services include remote control (FIG. 5), remote viewing (FIG. 6), activity logs (FIG. 7), and settings (FIG. 8). The status screen 404 includes a computer summary of each currently-monitored computer, including a computer name 414, its user 416, a status 420, whether active or offline, and a version 424 of the monitoring program 348 being used on the client computer 204.

Figure 5:
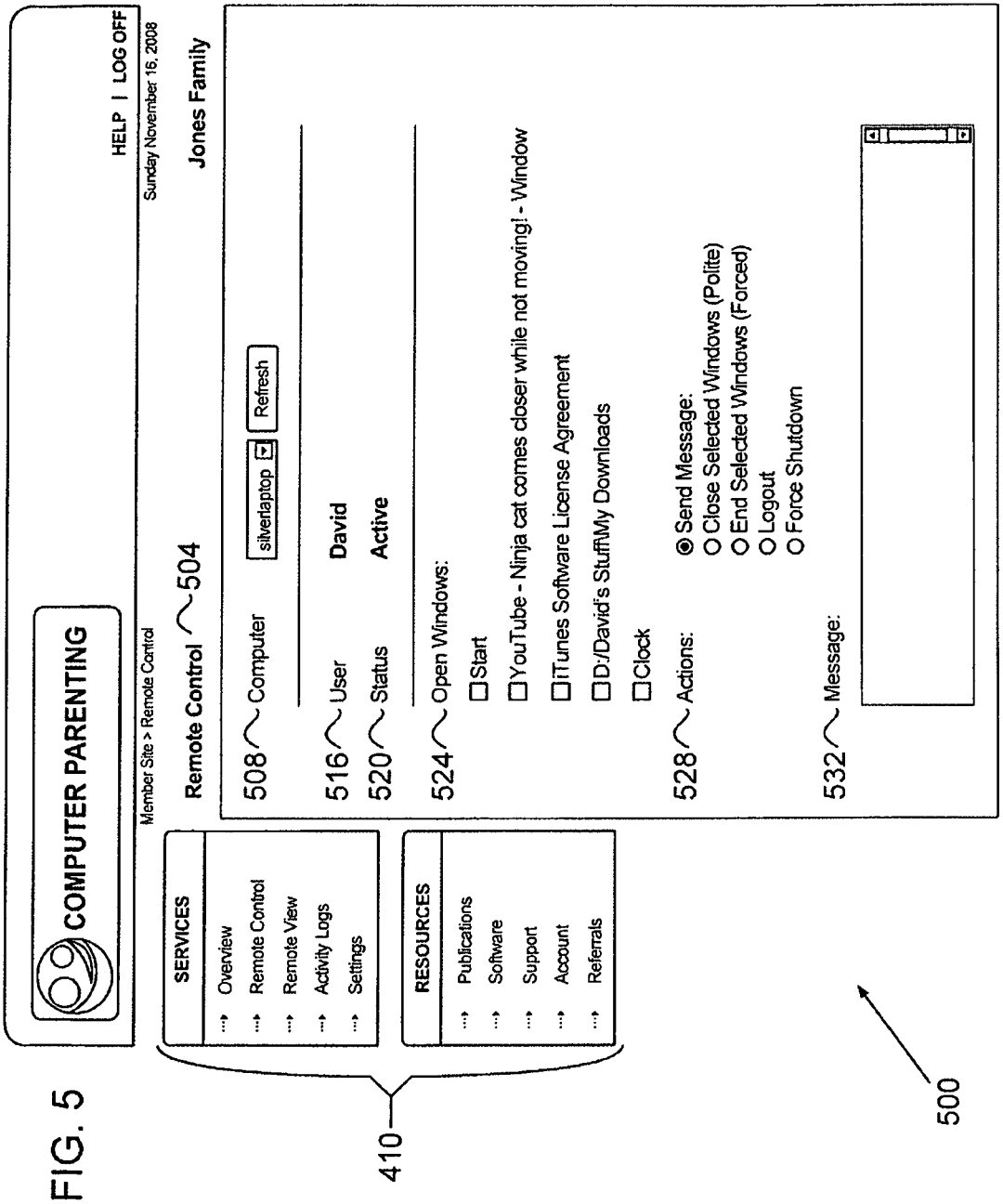
FIG. 5 is a screenshot of the monitoring software of FIG. 4, displaying remote control options to control remotely the monitored client computers.

FIG. 5 is a screenshot 500 of the monitoring web browser 228 of FIG. 4, displaying remote control options 504 to control remotely the monitored client computers 204. Included in the remote control options 504 are: a computer selection drop-down menu 508, a user 516, a status 520, a list of selectable open windows 524, an action 528 to be taken with regards to selected open windows, and a message box 532. Different or additional remote control options 504 are envisioned, and therefore, the above-enumerated are not to be taken as limiting. Taking remote control actions 528 with reference to the client computer 204 may send new or updated commands to the server 216 that directs the server 216 to interface with the client computer 204 to take such remote control actions 528.

Once the computer selection drop-down menu 508 is used to select a client computer 204 to be controlled remotely, an operator may select any of the detected open windows 524 to control. Once at least one window of interest is selected, the operator may then select an action 528 to be taken with reference to the selected open window(s) 524. Note that the list of actions 528 displayed include sending a message, politely closing the selected window(s) 524, forcibly ending the selected window(s) 524, logout, and forcing a shutdown of the client computer 204. The message box 532 may be used to send an explanatory message to the user of the client computer 204 as a way to explain the action taken in the selected window(s) 524 to the user, for instance, to reinforce disciplinary measures. Different rule or parameter violations may justify a differing degree of immediacy in the action 528 taken. The violation may be automatically detected and an alert sent to the operator, e.g., via a mobile device, or the violation may be noted through observing it in a remotely-displayed screenshot of the client computer 204.

Figure 6:
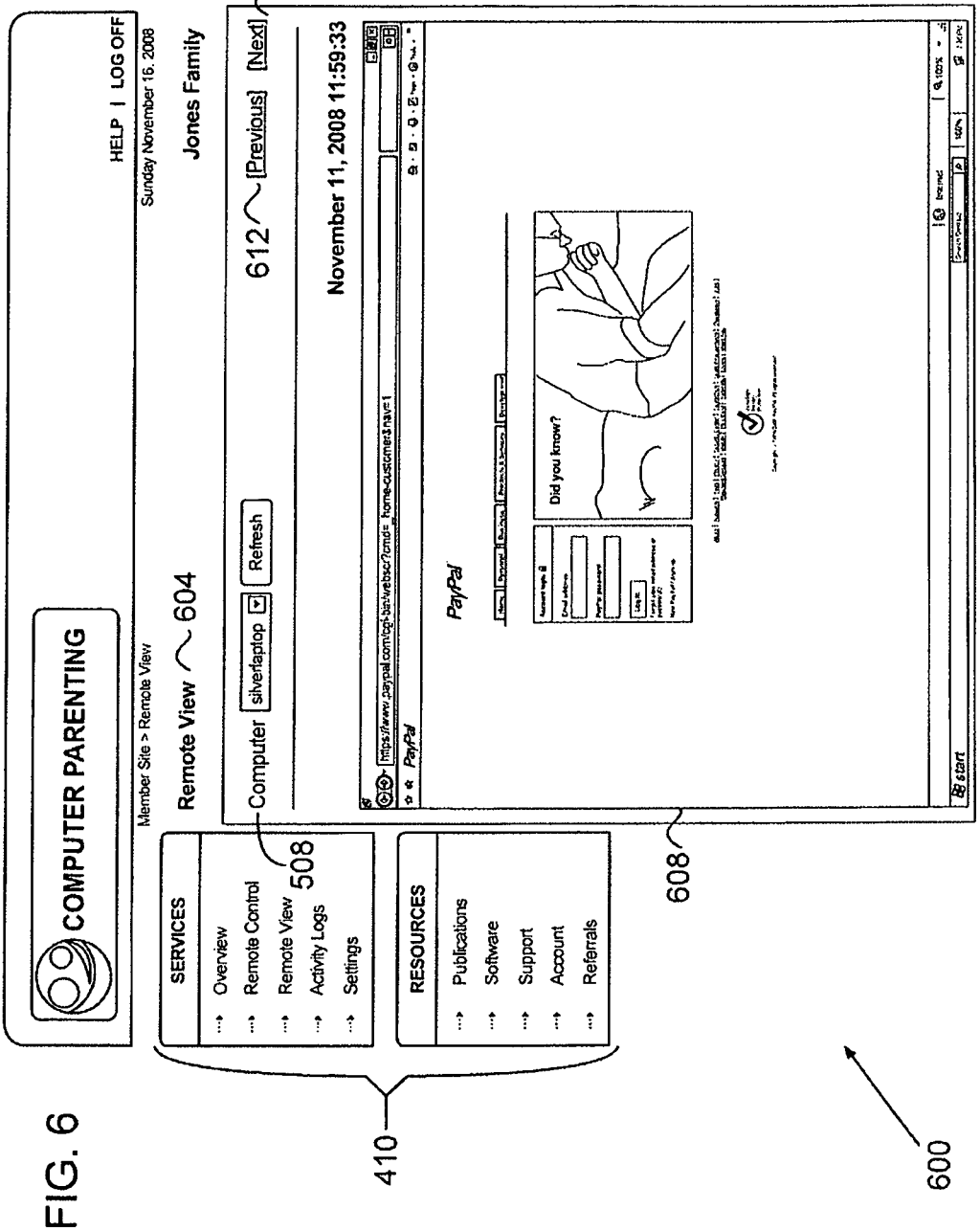
FIG. 6 is a screenshot of the monitoring software of FIG. 4, displaying a screenshot of one of the monitored client computers.

FIG. 6 is a screenshot 600 of the monitoring web browser 228 of FIG. 4, displaying a screenshot 608 of one of the monitored client computers 204. In the screenshot 608 of the silverlaptop client computer 204, for instance, is displayed a web browser 222 with the user visiting the PayPal website. Any number of other programs windows 224 may also be viewed remotely, including actions taken therein. Open program windows 524 may be stepped through by use of selection for previous 612 and next 616 screenshots 608 thereof. This is another source of detection of potential violations by a client computer 204 user, which the operator may use to motivate or justify a remote control action 528 through the screenshot 500 of FIG. 5.

Figure 7:
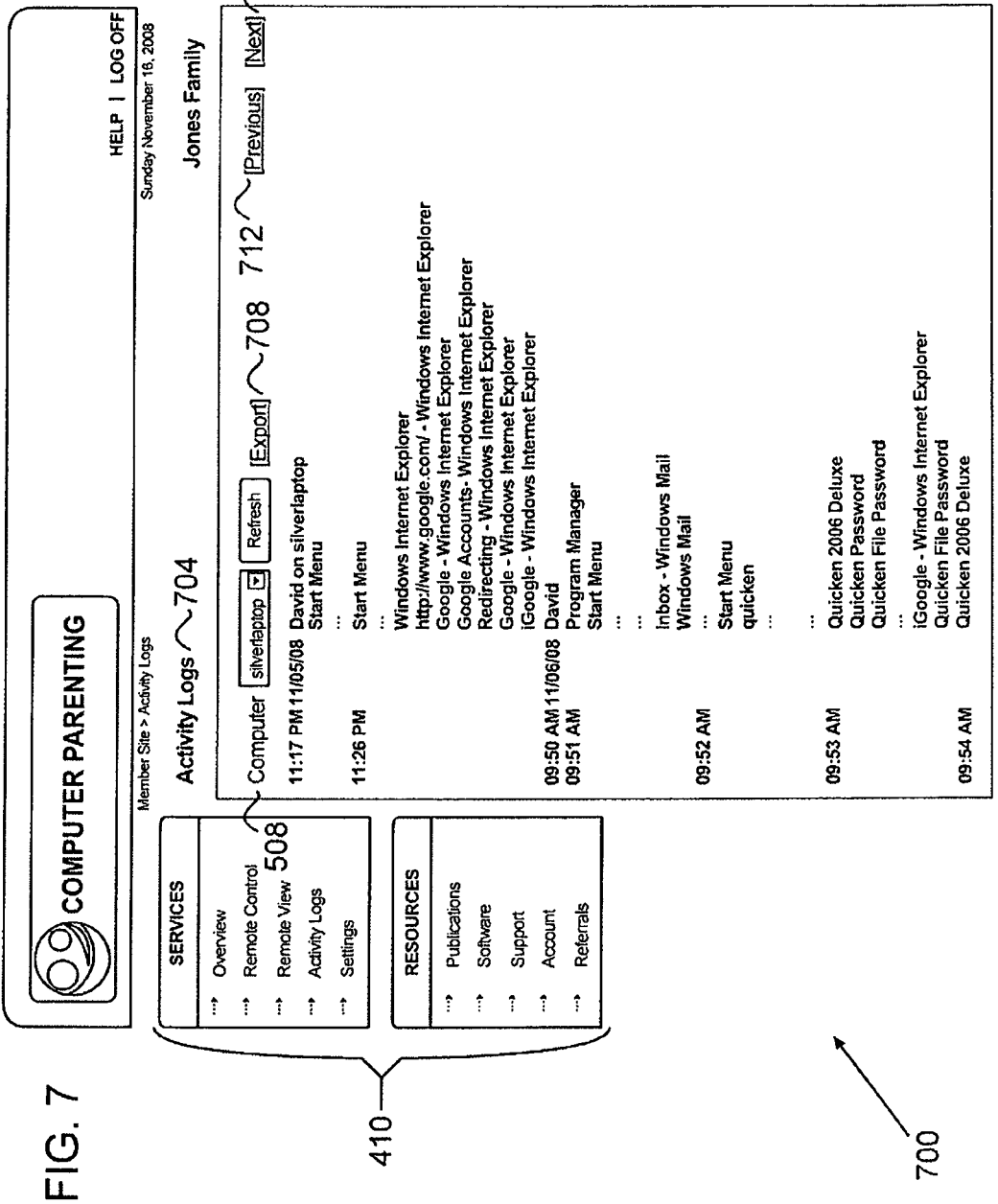
FIG. 7 is a screenshot of the monitoring software of FIG. 4, displaying an activity log of one of the monitored client computers.
Figure 8:
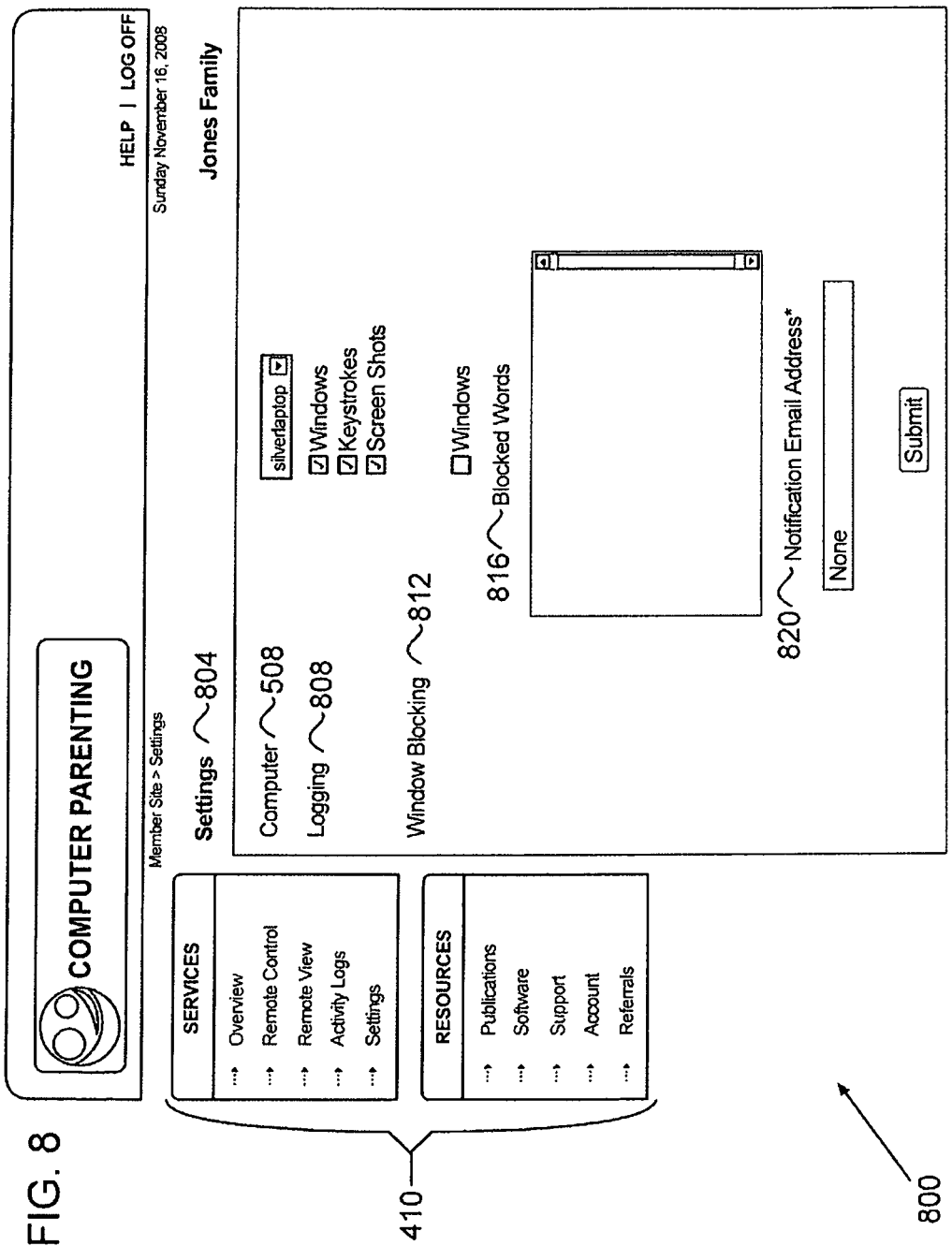
FIG. 8 is a screenshot of the monitoring software of FIG. 4, displaying a settings screen to allow settings of the client computers to be set remotely.

FIG. 7 is a screenshot 700 of the monitoring web browser 228 of FIG. 4, displaying activity logs 704 of one of the monitored client computers 204, in this case the silverlaptop. These activity logs 704 obtained from the client computer 204 and stored in the logs database 274 of the server 216 may thus be reviewed on the monitoring, third-party device 208. The activity logs 704 include an export option 708 to export the displayed activity log entries for storage and/or printing by the operator. Furthermore, the activity logs 704 may be browsed through use of selections for previous 712 and next 716 pages thereof, which may also be exported for storage or printing.

FIG. 8 is a screenshot 800 of the monitoring web browser 228 of FIG. 4, displaying a settings screen 804 to allow settings of the client computers 204 to be set remotely. The settings screen 804 includes, but is not limited to, the computer selection drop-down menu 508, a logging option 808, a windows blocking option 812 including a blocked words box 816, and a notification email address 820. Enabling logging through block 808 indicates whether to log windows, keystrokes, and/or screenshots, wherein additional logging actions may be initiated. The logging available through the settings screen 804 is an example of a situation in which the third party device 208 may send new or updated commands to the server 216, which then executes a change in control settings on the monitored client computer 204. The windows blocking option 812 enables input of blocked words through box 816 and an email address 820 input to indicate an email address of the operator to which to send alerts that the blocked words in box 816 have been detected. The use of alerts, and thus the sending of emails to the email address of the operator, is optional.

Figure 9:
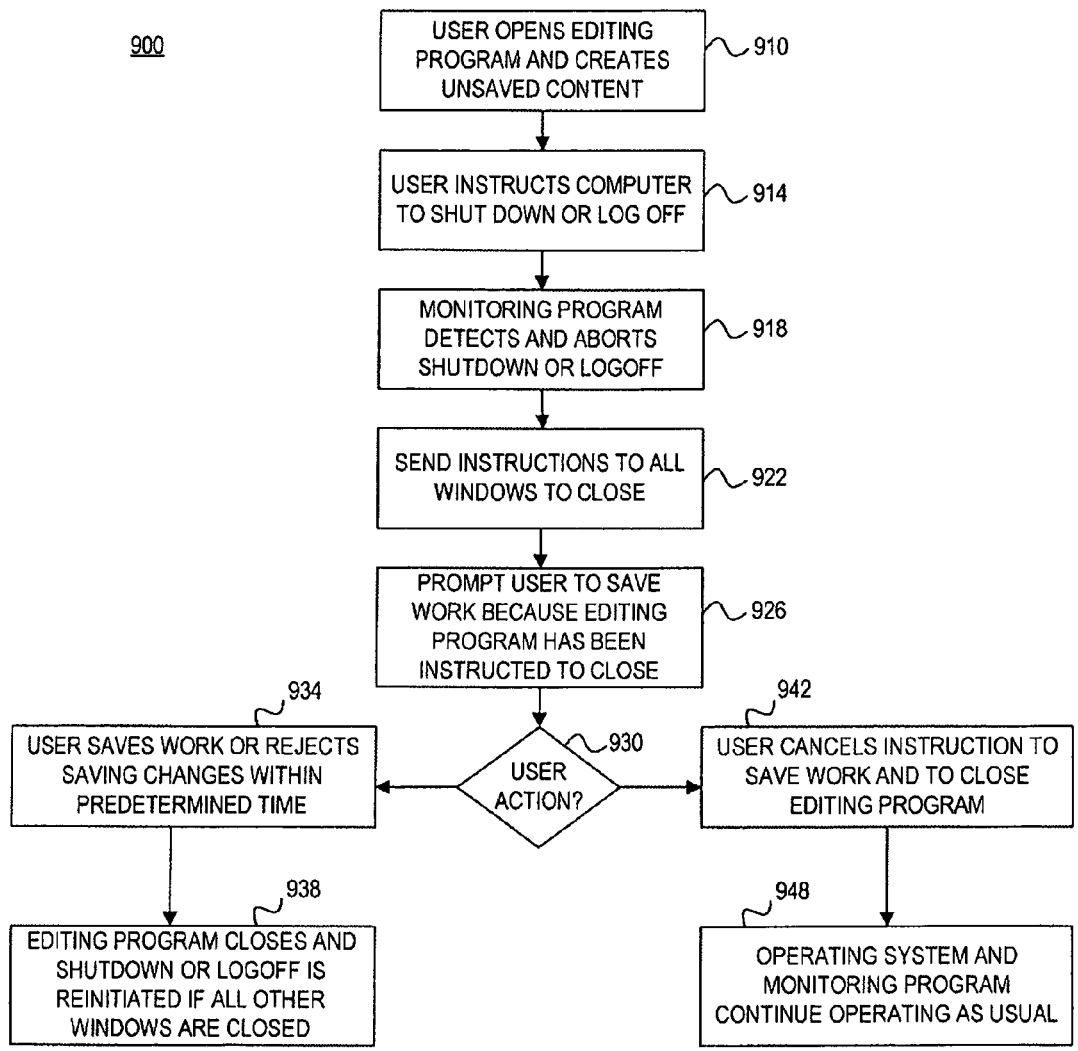
FIG. 9 is a flow chart of an exemplary method for reversing operating system shutdown when a program window remains open.

FIG. 9 is a flow chart 900 of an exemplary method for reversing operating system shutdown when a program window remains open. At block 910, a user opens an editing program (102) in the client computer 204 and creates unsaved content. At block 914, the user instructs the client computer 204 to shut down or log off. At block 918, the monitoring program 348 detects the shutdown or logoff and the same is aborted. At block 922, the monitoring program 348 sends instructions to all windows to close. At block 926, the client computer 204 prompts the user to save work in the editing program 102 because it has been instructed to close. At block 930, the monitoring program 348 detects the action of the user in response to the prompt to save work.

At block 934, the monitoring program 348 detects the user save work or reject saving changes within a predetermined time, such as within 10 seconds. At block 938, the editing program 102 is closed and shutdown or logoff is reinitiated if all other windows are closed. At block 942, the monitoring program 348 detects the user instead cancel instruction to save work and to close the editing program 102. At block 948, the operating system 372 and the monitoring program 348 of the client computer 204 continue to operate as usual, preventing shutting down the monitoring program 348 in response to a spoofed shutdown or logoff attempt.

Figure 10:
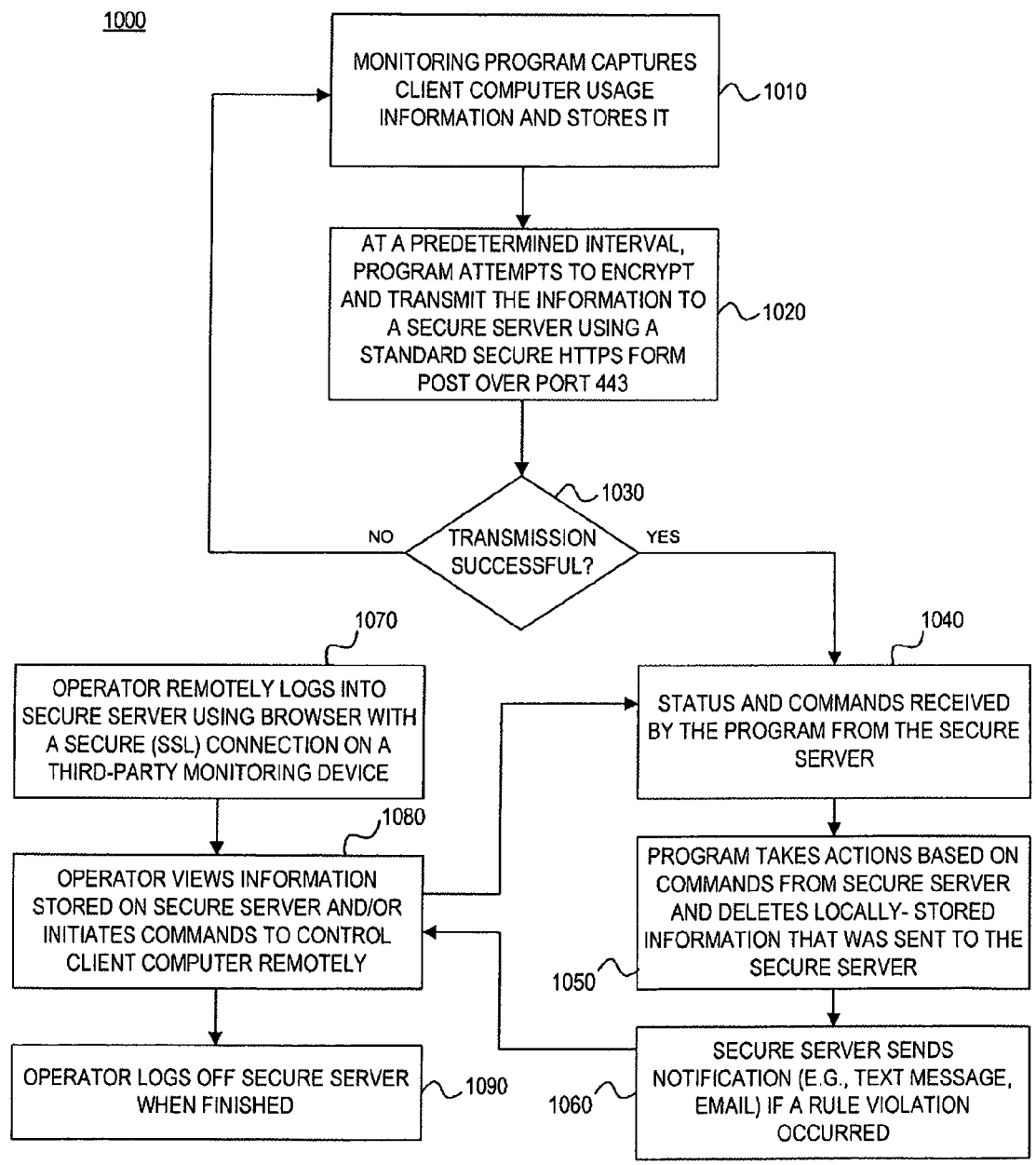
FIG. 10 is a flow chart of an exemplary method for remote monitoring and control of a client computer over the Web by a third party device through a secure server.

FIG. 10 is a flow chart 1000 of an exemplary method for remote monitoring and control of a client computer 204 over the Web 212 by a third party device 208 through a secure server 216. At block 1010, the monitoring program 348 captures client computer usage information and stores it along with previously stored information, if any. At block 1020, the program, at a predetermined interval of time, attempts to encrypt and transmit the information to the secure server 216 using standard secure HTTPS form post over port 443, or other appropriate port that bypasses typical firewall settings. At block 1030, the method determines if the transmission was successful. If not, the flow chart 1000 goes back to block 1010 to start over.

The transmission was successful, then at block 1040, the monitoring program 348 receives status and commands from the secure server 216. At block 1050, the monitoring program takes actions based on commands received from the secure server 216 and deletes locally-stored information that was sent to the secure server 216. At block 1060, the secure server 216 sends notification (e.g., via text message, email, etc.) if a rule violation has occurred based on activity control settings from executed commands.

At block 1070, an operator of the third-party monitoring device remotely logs into the secure server 216 using a browser 228 with a secure (SSL) connection. At block 1080, the operator views information stored on the secure server 216 and/or initiates commands to control the client computer 204 remotely. At block 1090, the operator logs off of the secure server 216 when finished.

By way of the secure server 216, commands entered by the operator at block 1080 are received by the client computer 204, at block 1040, for execution by the monitoring program 348 in order to carry out action at block 1050, which also includes updating activity control settings and rules. If a rule is violated, the secure server 216 may send an alert or notification to the third-party monitoring device 208 or a mobile device of the operator that the user of the client computer 204 has violated a rule or control setting. The device that receives the notification or alert may include the third-party monitoring device 208, which may occur at block 1080 while the operator is logged into the secure server 216.

In the foregoing description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those skilled in the art. Thus, any order appearing in the Figures, such as in flow charts, or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc. that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A computer-implemented method of reversing operating system logoff, shutdown, or restart request by a monitoring program as executed on a computer having an operating system capable of running a plurality of program windows, the method performed by the monitoring program comprising:
    detecting an attempt by a user to log off, shut down, or request restart of the computer with the purpose of disabling the monitoring program;
    determining whether one or more program windows, accessible to the user, are still open in the operating system that could prevent the operating system from completing the logoff, shutdown or restart request;
    automatically cancelling the logoff, shutdown, or restart request when it is determined that the one or more program windows remains open after a predetermined length of time, to prevent the monitoring program from being disabled;
    closing the one or more program windows that remain open after the predetermined length of time;
    reinitiating the logoff, shutdown, or restart of the computer system after all program windows are closed, such that the operating system shutdown is not reversed by an open program window; and
    wherein the computer launches two programs during start UP, wherein the two programs comprise the monitoring program for monitoring actions by the user remotely through a web browser of a communication device, and a watchdog program; wherein each of the two programs continues to launch the other of the two programs every predetermined number of seconds to prevent either of the two programs from being disabled; and
    wherein the computer launches a third program for disabling all system programs run by the operating system during normal operation that could be used to prevent the two programs from running or restarting each other.

2. The method of claim 1, wherein the system programs comprise at least one of a registry editor, a task manager, an operating system configuration program, and a combination thereof.

3. The method of claim 1, further comprising:
    detecting by at least one of the two programs a command to restart the computer; and rewriting instructions of the programs to an operating system of the computer to ensure the programs are properly restarted when the computer is restarted.

4. The method of claim 1, further comprising:
tracking and disabling a plurality dialogs created when the user attempts to delete browsing history or Internet cookies.

5. The method of claim 1, wherein the open program window comprises an editing program window, the method further comprising:
sending instructions by the monitoring program to the open program windows to close; and
prompting the user to save work in the editing program window.

6. A computer for reversing operating system logoff shutdown, or restart request by a monitoring program as executed on a computer having an operating system capable of running a plurality of program windows, the computer including a processor and having installed thereon the monitoring program, the client computer containing an operating system capable of running a plurality of program windows, wherein the monitoring program in conjunction with the processor:
detects an attempt by a user to log off, shut down, or restart the computer with the purpose of disabling the monitoring program;
determines whether one or more program windows, accessible to the user, are still open in the operating system that could prevent the operating system from completing the logoff, shutdown or restart request;
automatically cancels the logoff, shutdown, or restart request when it is determined that the one or more program windows remains open after a predetermined length of time, to prevent the monitoring program from being disabled;
closes the one or more program windows that remain open after the predetermined length of time;
reinitiates the logoff, shutdown, or restart of the computer system after all program windows are closed, such that the operating system shutdown is not reversed by an open program window; and
wherein the computer launches two programs during start UP, wherein the two programs comprise the monitoring program for monitoring actions by the user remotely through a web browser of a communication device, and a watchdog program; wherein each of the two programs continues to launch the other of the two programs every predetermined number of seconds to prevent either of the two programs from being disabled; and
wherein the computer launches a third program for disabling all system programs run by the operating system during normal operation that could be used to prevent the two programs from running or restarting each other.

7. The computer of claim 6, wherein the system programs comprise at least one of a registry editor, a task manager, an operating system configuration program, and a combination thereof.

8. The computer of claim 6, wherein the open program window comprises an editing program window, wherein the monitoring program:
sends instructions to the open program windows to close; and
prompts the user to save work in the editing program window.

9. A non-transitory computer recordable media comprising a set of instructions for reversing operating system logoff, shutdown, or restart request, by a computer executed by a processor and memory, the non-transitory computer recordable media comprising instructions for implementing a monitoring program as executed on the computer having an operating system capable of running a plurality of program windows to:
direct the processor to detect an attempt by a user to log off, shut down, or restart the computer with the purpose of disabling the monitoring program;
direct the processor to determine whether one or more program windows, accessible to the user, are still open in the operating system that could prevent the operation system from completing the logoff, shutdown or restart request;
direct the processor to cancel the logoff, shutdown, or restart request when it is determined that the one or more program windows remains open after a predetermined length of time, to prevent the monitoring program from being disabled;
close the one or more program windows that remain open after the predetermined length of time; and
direct the processor to re-initiate the logoff, shutdown, or restart of the computer system after all program windows are closed, such that the operating system shutdown is not reversed by an open program window; and
wherein the computer launches two programs during start up, wherein the two programs comprise the monitoring program for monitoring actions by the user remotely through a web browser of a communication device, and a watchdog program; wherein each of the two programs continues to launch the other of the two programs every predetermined number of seconds to prevent either of the two programs from being disabled; and
wherein the computer launches a third program for disabling all system programs run by the operating system during normal operation that could be used to prevent the two programs from running or restarting each other.

* * * * *